Jan. 11, 1927.
W. C. WRIGHT
GRAVITY METER
Filed Dec. 19, 1925
1,613,814
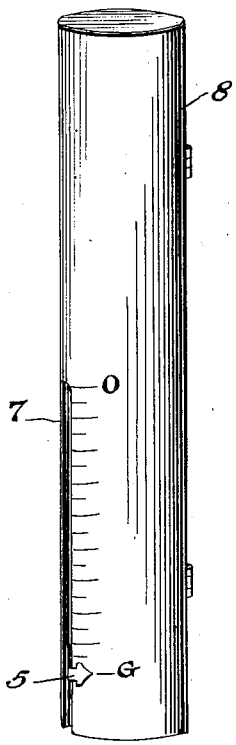
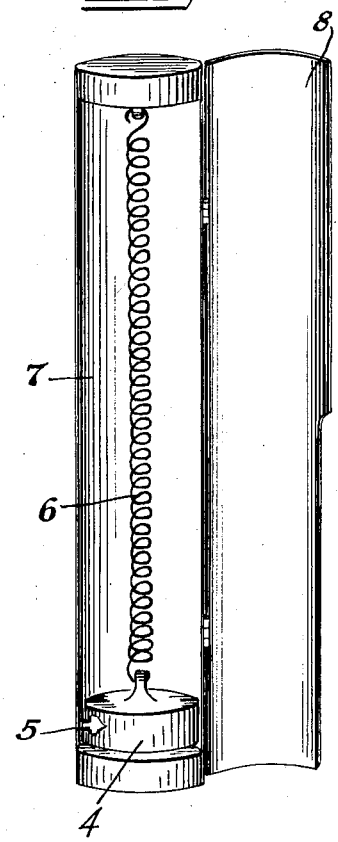
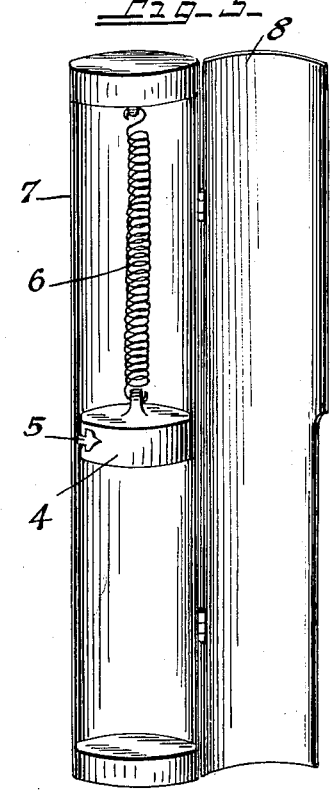
Inventor
Wayne C. Wright Patented Jan. 11, 1927.

UNITED STATES PATENT OFFICE.

WAYNE C. WRIGHT, OF SILOAM SPRINGS, ARKANSAS.

GRAVITY METER.

Application filed December 19, 1925. Serial No. 76,412.

This invention relates to a gravity-meter adapted to be used with air craft and has for its object to provide a device for the purpose described, controlled by the force of gravity, to indicate the distance above the surface of the earth at any height regardless of the altitude.

In the drawings forming a portion of this specification, and in which like numerals of reference indicate similar parts in the several views—

Fig. 1 is a view of the gravity-meter complete, enclosed in the cylindrical case 7. This view shows a slot in case lid 8, to allow the indicator hand 5, which is attached to the weight 4, to move up and down in ascending and descending.

Fig. 2 is a detail view showing the gravity-meter attached in the cylindrical case 7, with the case lid 8, open, the coil spring 6, is securely fastened at the top of cylindrical case 7, with the weight 4, attached to the spring 6, the indicator hand 5, is attached to the weight 4, this view shows the position of the gravity-meter when on the surface of the earth.

Fig. 3 is a detail view of the gravity-meter attached in the cylindrical case 7, with case lid 8, open to show the position of coil spring 6, the weight 4, and the indicator hand 5, where the indicator hand 5, will stand at 0, or neutral position.

Any style device desired may be clamped around the cylindrical case 7, from which to swing the gravity-meter to a pivot attachment on the air craft, that the gravity-meter may be free to swing in an upright position.

Referring now to the drawings there is shown a cylindrical case 7, with an inlet side hinged lid 8 opening, with a cutaway on side of lid to provide a slot for the indicator hand 5, said hand movable up and down by the weight 4, a coil spring 6, a weight 4, an indicator hand 5, means for detachably securing said spring 6, to the case upon insertion and removal of same.

In ascending the force of gravity decreases, in descending the force of gravity increases, the tension of the coil spring 6, will weigh any fraction of the decrease or increase of the force of gravity and the hand 5, will indicate the different height.

When on the ground the weight 4, which fits loosely in the cylindrical case 7, is sufficiently heavy to pull the coil spring 6, down until the indicator hand 5, stands at line G as shown in Fig. 2, which is as low as the force of gravity will pull the weight 4, and the weight 4, is balanced between the force of gravity and the tension of the coil spring 6.

As the gravity-meter ascends the force of gravity decreases on the weight 4, and the tension of the spring 6, will raise the weight 4, up. As it goes up the indicator hand 5, will indicate the distance between the gravity-meter and the surface of the earth.

In either ascending or descending the indicator hand 5, will indicate the distance of the gravity-meter above the surface of the earth.

At any point wherever the indicator hand 5, may stand, below said point to G, will indicate the distance to the earth.

As the gravity-meter descends the force of gravity attracts the weight 4, and pulls the weight 4, down, until the surface of the earth is reached then the indicator hand 5, will stand at G, the low or ground position.

The force of gravity being practically as great on the surface of the earth at one place as another the gravity-meter will indicate the same on elevated land as it will at sea level.

When over sea level the gravity-meter and an altitude barometer will indicate the same height above sea level. But when over land the surface of the earth being at various elevations the gravity-meter will indicate the distance above the rise and fall in the land while the altitude barometer will register the distance above sea level.

It would be of great advantage when used with air craft, as when flying at night, in a fog, or a snow storm, or above clouds, or in approaching mountains, the gravity-meter would indicate when nearing the earth, in time to go higher or change the course.

Although the air craft might be flying at 20,000 feet altitude above sea level it might be only 5,000 feet, more or less above the mountains. Therefore the gravity-meter would indicate the distance above the top of the mountains regardless of the altitude.

What is claimed is:—

A gravity-meter for the purpose described, comprising a cylindrical case, with an inlet side hinged lid, to provide an opening for insertion of the coil spring and weight, means for detachably securing the coil spring to the case upon insertion and removal of said member, said hinged lid having a portion cut away to provide a slot when lid is closed, for movement of the indicator hand, as said hand is moved up and down by the weight, a coil spring to be engaged with the weight, a weight attached to a coil spring and balanced between the tension of the spring and the force of gravity, an indicator hand attached to the weight, said hand to extend over the edge on to the face of the lid, to indicate the different heights the gravity-meter is above the surface of the earth.

In testimony whereof I have affixed my signature.

WAYNE C. WRIGHT.